H. W. WATSON.
HAY SWEEP.
APPLICATION FILED JULY 16, 1917.
1,255,365.
Patented Feb. 5, 1918.
2 SHEETS—SHEET 1.
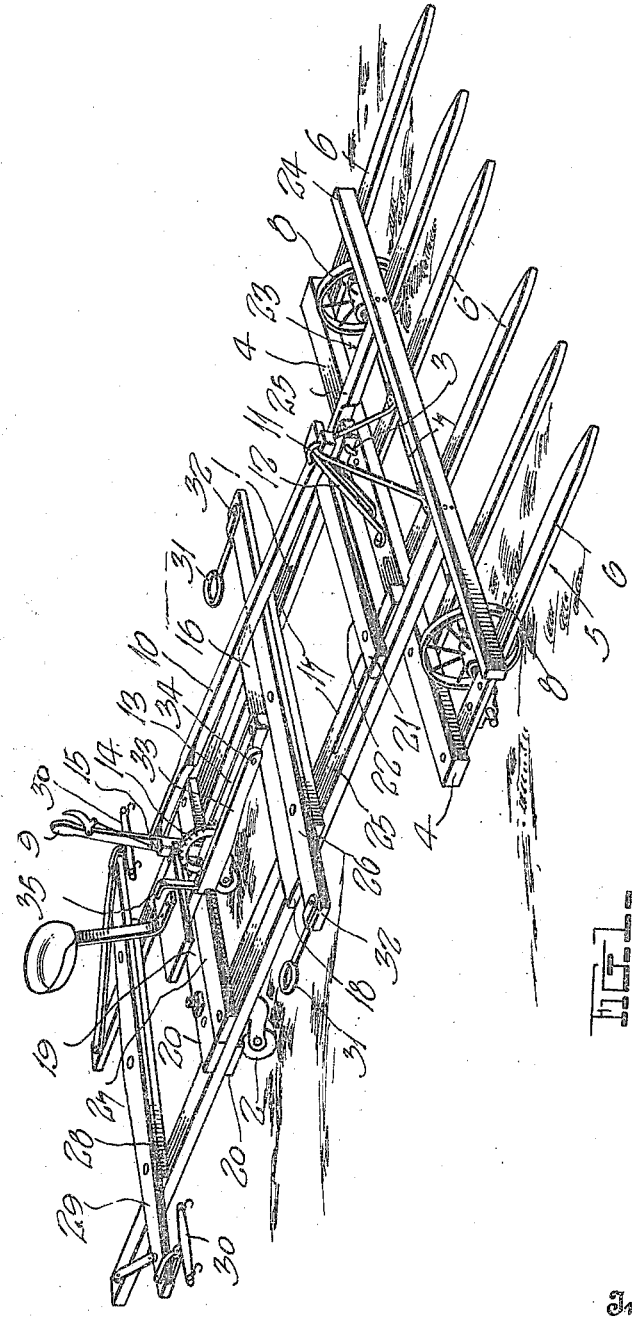
Inventor
H. W. Watson
Witness
H. Woodard

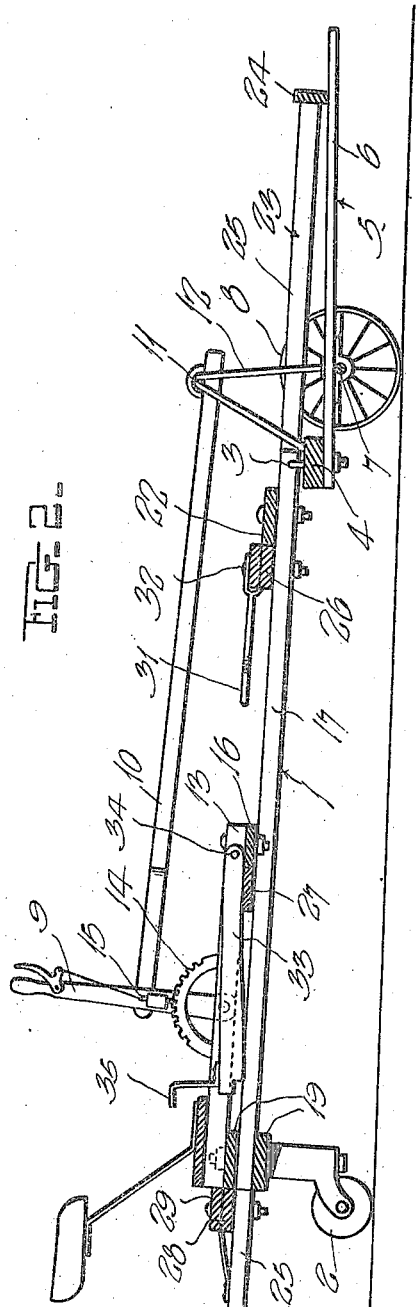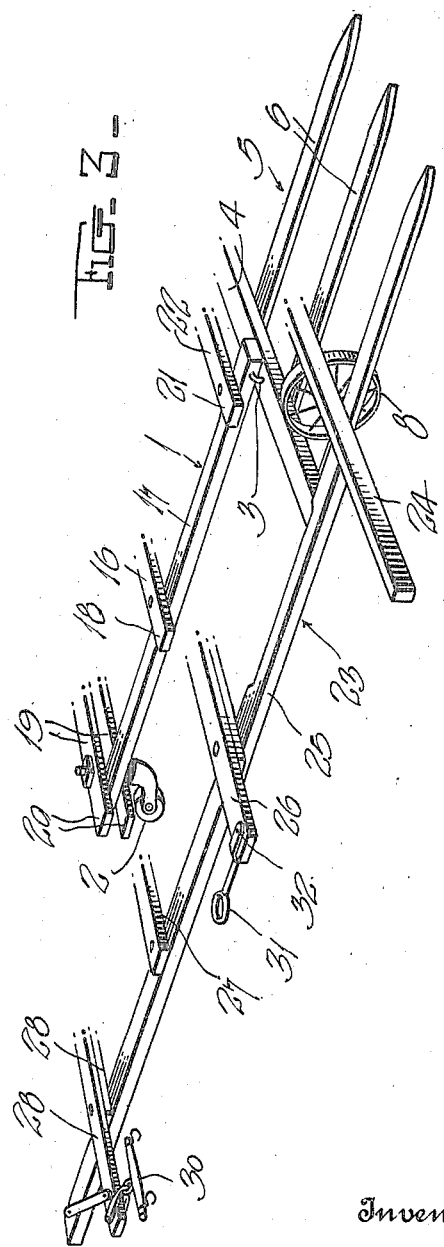

UNITED STATES PATENT OFFICE.

HUGH W. WATSON, OF GRAND ISLAND, NEBRASKA.

HAY-SWEEP.

1,255,365.   Specification of Letters Patent.   Patented Feb. 5, 1918.

Application filed July 16, 1917.   Serial No. 180,912.

*To all whom it may concern:*

Be it known that I, HUGH W. WATSON, a citizen of the United States, residing at Grand Island, in the county of Hall and State of Nebraska, have invented certain new and useful Improvements in Hay-Sweeps; and I do declare the following to be a full, clear, and exact description of the invention, such as will enable others skilled in the art to which it appertains to make and use the same.

My invention relates to improvements in hay sweeps which are employed for depositing hay and the like upon the forks of hay stacking machines, the principal object being to provide a sweep by the use of which the hay may be forced upon the stacking fork to the required extent, without danger of breaking the teeth of the sweep fork and without the necessity of moving the entire sweep a number of times forwardly and rearwardly.

Another object of the invention is to so connect the sweep fork with the frame as to cause the weight of the latter to assist in raising the fork when loaded with hay.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a perspective view of a hay sweep constructed in accordance with my invention;

Fig. 2 is a central longitudinal section with the follower projected to discharge a load of hay from the fork; and Fig. 3 is a disassembled perspective view of one side of the machine, showing more clearly the relatively fixed and movable parts.

In the drawings above briefly described, the numeral 1 designates the main frame of the improved sweep, the rear end of said frame being supported on caster wheels 2, whereas the front end of the frame in question is pivotally connected at 3 with a transverse bar 4 at the rear end of the fork 5, said fork including the usual forwardly extending tines 6. A suitable distance in advance of the bar 4, an axle 7 extends beneath the tines 6 and is secured thereto, a pair of supporting wheels 8 being rotatably mounted on said axle for supporting the entire front end of the machine. Due to the fact that the weight of the frame 1 is supported upon the fork 5, in rear of the axle 7, the latter will serve as a fulcrum upon which the fork will be tilted so as to normally raise the front ends of the tines 6 clear of the earth.

It is of course necessary to force the tines 6 downwardly when the fork 5 is to be forced under a stack of hay, and for obtaining this result, any preferred means may be employed. For instance, a hand lever 9, and a link 10 may be utilized for this purpose, said link being pivotally connected at 11 to a rigid arched frame 12 which rises from the fork 5, whereas the lever 9 will be fulcrumed to a longitudinally extending bar 13 forming part of the frame 1. Any preferred means such as a rack 14 and a dog 15 may be employed for holding the lever 9 in adjusted position.

The front end of the bar 13 is secured to a transverse bar 16 which rests upon and is rigidly secured to the parallel side bars 17 of the frame 1, said bar 16 extending beyond the bars 17 to form fingers 18 for a purpose to appear. The rear end of the bar 13 rests on and is secured to the uppermost of a pair of superimposed transverse bars 19 which are rigidly secured to the rear ends of the side bars 17, being positioned in contact with the upper and lower sides of said bars as shown. The bars 19 extend beyond the side bars 17 to form vertically spaced horizontal fingers 20, and additional fingers 21 are formed by the projecting ends of a fourth transverse bar 22 which rests on and is rigidly secured to the front ends of the bars 17.

An auxiliary frame 23 is mounted slidably on the main frame 1 and at its front end carries a follower 24 which is positioned adjacent the upper side of the fork 5 and is adapted to force the hay or the like forwardly from said fork when projected. Frame 23 includes a pair of parallel side bars 25, of slightly less cross sectional area, but of greater length than the side bars 17, said bars 25 contacting slidably with the outer sides of said bars 17 and being received between the fingers 20 and beneath the fingers 18 and 21 as will be clear from the drawings. Transverse bars 26 and 27 are secured to the upper sides of the bars 25 and rest slidably upon the side bars 17, the bar 26 being positioned between the bars 16 and 22, whereas bar 27 is located between the bars 19 and 16. By this construction, it will be obvious that the frame 23 is slidably supported in a simple yet effective manner, both the forward and the rearward movement of said frame being limited by the bar 27 which abuts the uppermost of the bars 19 when the frame 23 is shifted rearwardly, and similarly strikes the bar 16 when said frame is moved forwardly. In addition to limiting the movement of the frame 23, however, it will be obvious that the bar 27, as well as the bar 26, serves to support the front end of said frame.

A rear transverse bar 28 connects the rear extremities of the side bars 25 and carries a doubletree 29, the ends of said doubletree extending beyond the side bars 25 and being provided with swingletrees 30 to which a pair of animals are to be hitched. The usual neck yoke 31 is pivoted at 32 to the transverse bar 26 and serves the well known function. By this arrangement, it will be clear that the frame 23 may be moved forwardly or rearwardly as occasion may demand, while the main frame 1 and its fork 5 remain stationary. In order to prevent forward movement of frame 23, however, while the sweep is carrying a load to the stacker, any suitable means such as the vertically swinging latch 33 may be employed, said latch being preferably pivoted at 34 to the bar 13 and having on its rear end a suitable device 35 whereby it may be raised by hand or foot.

In operation, the sweep is forced under a hay cock or stack in the usual manner, after first lowering the tines 6, after which the lever 9 is pulled rearwardly to raise said tines and then locked in such position by the dog 15 and rack 14. During this operation, since the weight of the frame 1 is supported upon the fork 5, in rear of the shaft 7, such weight will assist materially in raising the fork. The device having been loaded it is drawn to the stacker, the fork 5 being positioned above the fork of the stacker in the usual manner. Fork 5 is now lowered by means of the lever 9 and the latch 3 is then released. This having been done, the horses are driven forwardly so that the entire frame 23 slides upon the frame 1 and forces the follower 24 forwardly against the load of hay, with the result that this load is forced from the fork 5 onto the fork of the stacking machine, by this means, the hay may be positioned as far upon the stacking fork as required, without the necessity of moving the entire sweep forwardly and rearwardly a multiplicity of times. If required, however, it will be obvious that the frame 23 may be alternately moved forwardly and rearwardly until the hay is positioned at the most advantageous point. After this work is accomplished, the frame 23 is returned to its initial position and held in such position by the latch 33, so that the sweep is in condition for further use. By operating the machine in this manner, there is no danger whatever of breaking the tines 6 and the operation of transferring the hay from the fork of the sweep to that of the stacker, is greatly simplified.

Since probably the best results are obtained from the specific construction shown and described, this construction constitutes the preferred form of the improved sweep. It is to be understood, however, that within the scope of the invention as claimed, numerous minor changes may well be made.

I claim:

1. A hay sweep comprising a main portable frame having a fork at its front end, said frame including a pair of parallel side bars, an auxiliary frame slidably supported on the main frame and also having a pair of parallel side bars, said last named bars contacting slidably with the side bars of said main frame, means for maintaining the two pairs of bars in operative relation, a follower carried by the front end of said auxiliary frame for forcing the load from the fork, releasable means for preventing forward sliding of said auxiliary frame, the rear end of said auxiliary frame extending rearwardly from said main frame, and means on said projecting end of the auxiliary frame for hitching an animal to said auxiliary frame, whereby to shift the same forwardly when said releasable means is disengaged, and whereby to propel the entire machine, when said releasable means is in operative position.

2. A hay sweep comprising a main portable frame having a fork at its front end, an auxiliary frame slidably supported on said main frame and including a pair of parallel side bars contacting slidably with the side bars of said main frame, a follower at the front end of said auxiliary frame for forcing the load forwardly from the fork, the rear end of said auxiliary frame projecting rearwardly beyond said main frame, means for preventing forward movement of said auxiliary frame until required, means for hitching an animal to said projecting end of the auxiliary frame, and a plurality of transverse bars secured to the two frames, the ends of said bars being positioned above and below and serving as guiding means for the side bars of said auxiliary frame.

3. A hay sweep comprising a main portable frame having a fork at its front end, said frame having front, rear, and intermediate transverse bars secured to the upper side of its side bars and extending beyond the same to provide fingers, said frame having an additional transverse bar beneath the rear transverse bar and also extending beyond the side bars, an auxiliary frame including a pair of parallel longitudinal side bars contacting slidably with the outer faces of said first named side bars and extending both forwardly and rearwardly therefrom, said side bars of said auxiliary frame being received between the rear fingers of said main frame and beneath the front and intermediate fingers thereof, a follower carried by the front end of said auxiliary frame for forcing the load from the fork, a doubletree carried by the rear end of said auxiliary frame, transverse bars secured to the side bars of said auxiliary frame and resting on the side bars of said main frame, and means for preventing forward sliding of the auxiliary frame until required.

In testimony whereof I have hereunto set my hand in the presence of two subscribing witnesses.

HUGH W. WATSON.

Witnesses:
BENJ. J. CUNNINGHAM,
F. E. SLUSSER.

Copies of this patent may be obtained for five cents each, by addressing the "Commissioner of Patents, Washington, D. C."